United States Patent
Levi et al.

(10) Patent No.: US 10,094,919 B2
(45) Date of Patent: Oct. 9, 2018

(54) RADAR-VISION FUSION FOR TARGET VELOCITY ESTIMATION

(71) Applicant: GM Global Technology Operations LLC, Detroit, MI (US)

(72) Inventors: Dan Levi, Kyriat Ono (IL); Shuqing Zeng, Sterling Heights, MI (US); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 425 days.

(21) Appl. No.: 14/876,134

(22) Filed: Oct. 6, 2015

(65) Prior Publication Data
US 2017/0097411 A1    Apr. 6, 2017

(51) Int. Cl.
G01S 13/42    (2006.01)
G01S 13/58    (2006.01)
G01S 13/86    (2006.01)
G01S 7/40    (2006.01)
G01S 13/93    (2006.01)

(52) U.S. Cl.
CPC .............. G01S 13/58 (2013.01); G01S 13/42 (2013.01); G01S 13/867 (2013.01); G01S 7/40 (2013.01); G01S 13/931 (2013.01)

(58) Field of Classification Search
CPC ...... G01S 13/58; G01S 13/867; G01S 13/931; G01S 7/40
USPC .......................................................... 342/52
See application file for complete search history.

(56) References Cited

U.S. PATENT DOCUMENTS

2015/0063648 A1* 3/2015 Minemura ........... G06K 9/6217
382/104

* cited by examiner

*Primary Examiner* — Timothy A Brainard
(74) *Attorney, Agent, or Firm* — Cantor Colburn LLP

(57) ABSTRACT

A method of determining velocity of a target and a fusion system on a moving platform to determine the velocity of the target are described. The method includes obtaining, using a radar system, position and radial velocity of the target relative to the moving platform, obtaining, using a vision system, optical flow vectors based on motion of the target relative to the moving platform, and estimating a dominant motion vector of the target based on the optical flow vectors. The method also includes processing the position, the radial velocity, and the dominant motion vector and determining the velocity of the target in two dimensions.

20 Claims, 2 Drawing Sheets

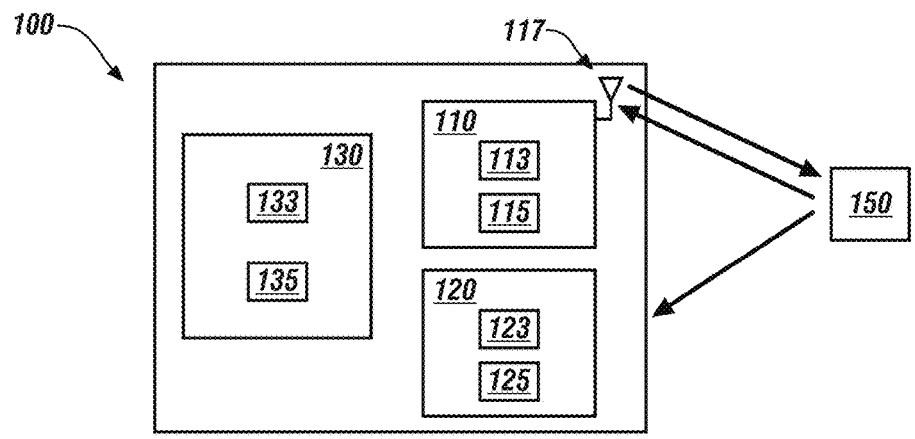
FIG. 1
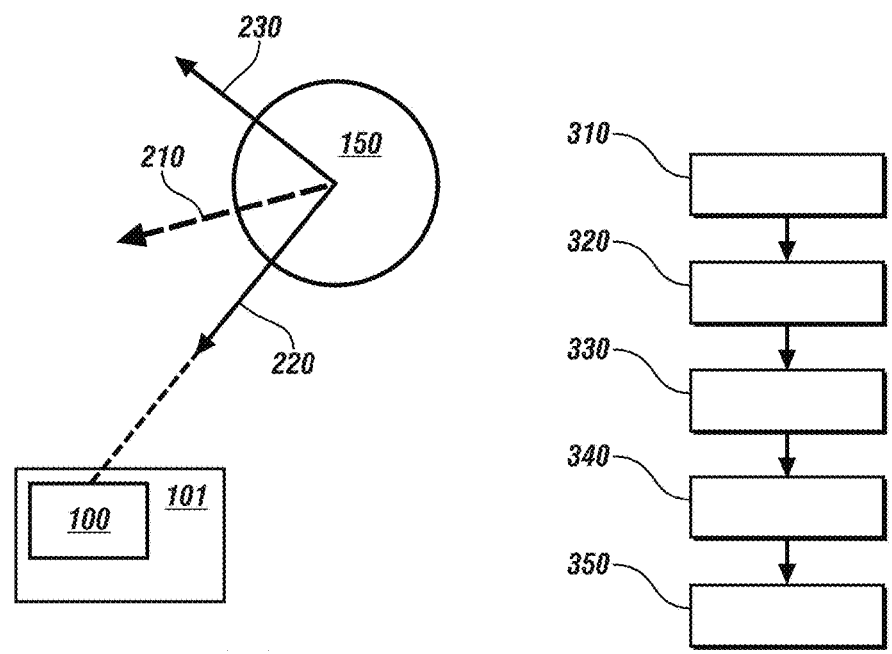
FIG. 2
FIG. 3

RADAR-VISION FUSION FOR TARGET VELOCITY ESTIMATION

FIELD OF THE INVENTION

The subject invention relates to radar-vision fusion for target velocity estimation.

BACKGROUND

Information and data gathering using sensors is increasingly available on a wide variety of platforms including personal portable devices, vehicles, and computing devices. Many platforms make use of multiple types of sensors. In the case of vehicles of all varieties, for example, global positioning system (GPS) receivers in addition to other sensors—infrared, radar, vision (camera)—are increasing in use. Usually, the information gathered by each type of sensor is used for a different purpose. Accordingly, it is desirable to provide a fusion of radar and camera systems for target velocity estimation.

SUMMARY OF THE INVENTION

In one exemplary embodiment of the invention, a method of determining velocity of a target from a moving platform includes obtaining, using a radar system, position and radial velocity of the target relative to the moving platform; obtaining, using a vision system, optical flow vectors based on motion of the target relative to the moving platform; estimating a dominant motion vector of the target based on the optical flow vectors; and processing, using a processor, the position, the radial velocity, and the dominant motion vector and determining the velocity of the target in two dimensions.

In another exemplary embodiment of the invention, a fusion system on a moving platform to determine velocity of a target includes a radar system configured to obtain position and radial velocity of the target relative to the moving platform; a vision system configured to obtain optical flow vectors based on motion of the target relative to the moving platform and estimate a dominant motion vector based on the optical flow vectors; and a processor configured to determine the velocity of the target based on the position, the radial velocity, and the dominant motion vector.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 1 is a block diagram of the fusion system according to embodiments;

FIG. 2 illustrates the obtained information and desired information for a fusion system according to embodiments;

FIG. 3 is a process flow of a method of determining target velocity according to embodiments;

DESCRIPTION OF THE EMBODIMENTS

Figure 4:
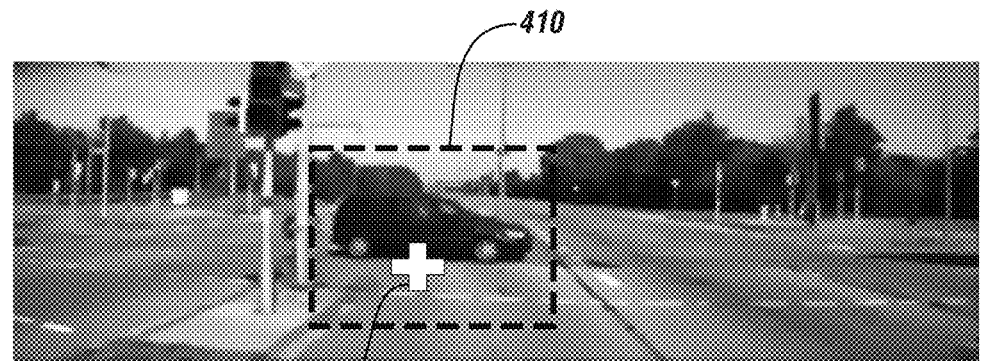
FIG. 4 illustrates the target and RoI identification and position determination by the radar system according to the process flow shown in FIG. 3.

The following description is merely exemplary in nature and is not intended to limit the present disclosure, its application or uses. It should be understood that throughout the drawings, corresponding reference numerals indicate like or corresponding parts and features.

As noted above, many platforms have multiple types of sensors that gather data for different purposes. For example, a GPS receiver is used to determine position, vision or camera systems may be used to detect lateral motion (angular velocity), and radar systems measure range and longitudinal velocity. Embodiments of the systems and methods detailed herein relate to fusing the information available from a radar system and a vision system to overcome the limitations of each system. Specifically, the embodiments pertain to estimating target velocity based on a fusion of radar data and vision data. While the exemplary application of an automobile with the fusion system is illustrated for explanatory purposes, the embodiments are not limited to any particular platform.

FIG. 1 is a block diagram of the fusion system 100 according to embodiments. Although shown in FIG. 1 as being housed together for explanatory purposes, the fusion system 100 may be arranged with different components at different parts of a platform. A radar system 110 includes a transmit portion 113 and receive portion 115, which may each use a different antenna 117 or share the antenna 117 in a transceiver arrangement. The radar system 110 transmits radio frequency energy and receives reflected energy, reflected from a target 150. The reflected energy is shifted in frequency with reference to the incident transmitted energy based on relative motion between the radar system 110 and the target 150. This frequency shift, known as the Doppler shift, may be used to determine the longitudinal velocity (relative velocity along the line of sight). The time from transmission to reception may be used to determine the range to the target 150 from the radar system 110. The fusion system 100 also includes a vision system 120 which includes a camera 123 and an image processor 125. The image processor 125 may use the images obtained with the camera 123 to determine angular velocity of the target 150 relative to the vision system 120. The fusion system 100 further includes a processing portion 130. This processing portion 130 includes one or more memory devices 133 and one or more processors 135. The memory device 133 may store instructions as well as data obtained by one or both of the radar system 110 and the vision system 120. The processor 135 determines two-dimensional velocity of the target 150 based on a fusion of information from the radar system 110 and the vision system 120, as further discussed below.

FIG. 2 illustrates the obtained information and desired information for a fusion system 100 according to embodiments. The fusion system 100 may be part of a platform 101 such as a vehicle, for example. The fusion system 100 uses the radar system 110 to obtain longitudinal velocity vector 220. The fusion system 100 uses the vision system 120 to obtain lateral velocity vector 230. As noted and according to embodiments further discussed below, the fusion system 100 determines two-dimensional velocity 210 of the target 150 based on information from the radar system 110 and the vision system 120 that includes the longitudinal velocity vector 220 and the lateral velocity vector 230. The target 150 may be a vehicle, a pedestrian, or any other moving object. Once the two-dimensional velocity 210 of the target is determined, the information may facilitate a number of applications. For example, by estimating the two-dimensional velocity 210 of the target 150, the position of the target 150 at some future time may be predicted such that a threat assessment (e.g., determination of potential collision) or autonomous control decision (e.g., evasive action to avoid collision) may be undertaken. Two dimensional velocity 210 is of interest because a planar arrangement of the platform 101 and target 150 are assumed. In alternate embodiments, a third dimension may be added to the estimate and subsequent applications.

FIG. 3 is a process flow of a method of determining target 150 velocity (210) according to embodiments. At block 310, determining a position p (including range r to target 150) and radial velocity rv of the target 150 is performed using the radar system 110. This process begins with identification of the target 150. At block 320, defining the region of interest (RoI) for the vision system 120 includes calibrating the vision system 120 with the radar system 110. A calibrated vision system 120 has known parameters such as focal length, optical center, distortion, and three-dimensional mount position with respect to the platform 101. Given these parameters, a one-to-one mapping function may be determined to map a pixel from the ground (or close to the ground surface) to a point in the platform coordinate frame and vice versa. In this manner, the vision system 120 is calibrated. The mapping is further discussed below. Computing optical flow for points in the RoI, at block 330, involves obtaining two or more image frames using the vision system 120 and using known equations to determine optical flow vectors or motion of the target 150 relative to the vision system 120. At block 340, clustering is used on the computed optical flow vectors to find dominant motion $q=(q_u,q_v)$. Clustering involves assigning two optical flow vectors within a neighborhood to the same group if they are similar in terms of magnitude and orientation. Exemplary clustering algorithms include graph partition, mean shift, and watershed. The u-v coordinate system is the image coordinate system. At block 350, computing target velocity (two-dimensional velocity 210) includes using the minimization equation detailed below.

The dominant motion vector $q=(q_u,q_v)$, range r, and, from the radial velocity rv, radial speed s, and azimuth angle θ are all inputs obtained using the radar system 110. Then, at block 350, the two-dimensional velocity 210 is obtained as the solution to minimize:

$$v^* = \mathrm{argmin}_v \frac{\left|\frac{p^T v}{r} - s\right|^2}{\sigma^2} + (h(v,p)-q)^T \sum\nolimits^{-1} (h(v,p)-q) \quad [\text{EQ. 1}]$$

The target 150 position vector p is given by:

$$p=(r\cos\theta, r\sin\theta)^T \quad [\text{EQ. 2}]$$

The accuracy of the radial speed s provided by the radar system 110 is represented by σ. This value may be part of the specification provided with the radar system 110. Σ is the two-by-two covariance matrix representing the error of the dominant motion vector q estimate. Empirically, the sample covariance matrix of optical flow from the RoI may be used. h(v,p) denotes the function mapping the two-dimensional velocity 210 at position p in the top-down view x-y coordinate system (of the radar system 110) to the motion vector q in the u-v coordinate system (of the vision system 120). h(v,p) is pre-determined by the camera calibration process that is part of block 320 and assumes that the target 150 is moving on a flat ground surface. This assumption holds with the assumption of a planar arrangement of the platform 101 and target 150.

Figure 5:
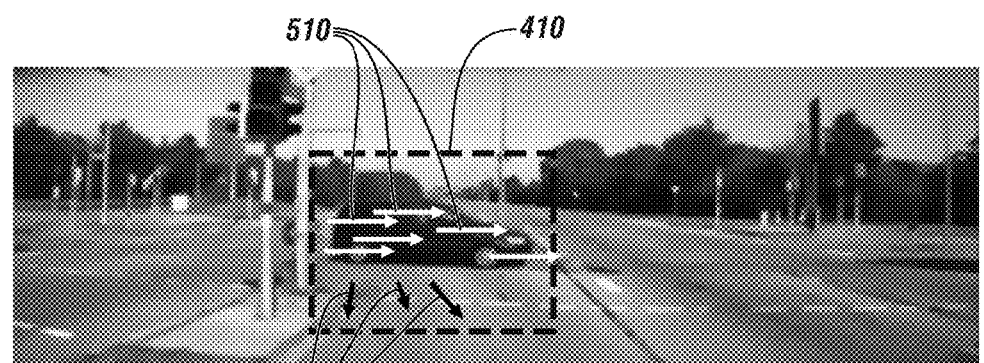
FIG. 5 illustrates the computation of optical flow for points in the RoI according to the process flow shown in FIG. 3.
Figure 6:
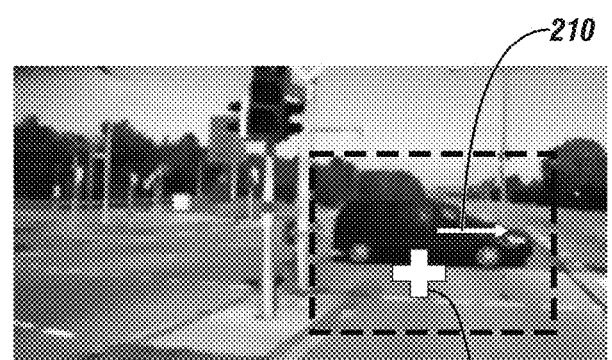
FIG. 6 illustrates the two-dimensional velocity of the target determined according to the process flow shown in FIG. 3.

FIGS. 4-6 illustrate processes discussed with reference to FIG. 3 for an exemplary target 150. The exemplary target 150 is a van. FIG. 4 illustrates the target and RoI 410 identification and position determination by the radar system 110 (blocks 310 and 320). The target identification by the radar system 110 is indicated by the "+." FIG. 5 illustrates the computation of optical flow for points in the RoI 410 (block 330). Exemplary dominant motion vectors q 510 are shown, as well (block 340). Each dominant motion vector q 510 is determined by its height in the world, range, azimuth, and both radial and tangential velocity. Exemplary non-dominant motion vectors 515 are also indicated in FIG. 5. FIG. 6 illustrates the two-dimensional velocity 210 of the target 150 determined with the minimization equation shown in EQ. 1 (block 350).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of determining velocity of a target from a moving platform, the method comprising:
obtaining, using a radar system, position and radial velocity of the target relative to the moving platform;
obtaining, using a vision system, optical flow vectors based on motion of the target relative to the moving platform;
estimating a dominant motion vector of the target based on the optical flow vectors;
processing, using a processor, the position, the radial velocity, and the dominant motion vector and determining the velocity of the target in two dimensions; and
performing, at the moving platform, evasive action based on assessment of a threat of collision posed by the target using the velocity of the target in the two dimensions.

2. The method according to claim 1, further comprising defining a region of interest using the radar system.

3. The method according to claim 2, wherein the obtaining the optical flow vectors using the vision system is for points in the region of interest.

4. The method according to claim 2, further comprising calibrating the vision system with the radar system, the calibrating including determining a mapping function to map an x-y coordinate system used by the radar system to a u-v coordinate system used by the vision system.

5. The method according to claim 1, wherein the determining the dominant motion vector includes clustering the optical flow vectors.

6. The method according to claim 1, further comprising determining range r, azimuth angle θ, radial speed s, and position vector p from the position and the radial velocity, determining accuracy σ a of the radial speed s, and obtaining a two-by-two covariance matrix Σ representing error in the domination motion vector estimate.

7. The method according to claim 6, wherein the determining the velocity of the target includes solving to minimize:

$$v^* = \text{argmin}_v \frac{\left|\frac{p^T v}{r} - s\right|^2}{\sigma^2} + (h(v, p) - q)^T \sum\nolimits^{-1} (h(v, p) - q),$$

v is the velocity of the target, h(v,p) is a function mapping the velocity of the target in an x-y coordinate system used by the radar system to the dominant motion vector q in a u-v coordinate system used by the vision system.

8. The method according to claim 6, wherein the determining the accuracy σ a of the radial speed s is based on a specification of the radar system.

9. The method according to claim 6, wherein the obtaining the two-by-two covariance matrix Σ includes using a covariance matrix of the optical flow vectors from a region of interest.

10. A fusion system on a moving platform to determine velocity of a target, the fusion system comprising:
 a radar system configured to obtain position and radial velocity of the target relative to the moving platform;
 a vision system configured to obtain optical flow vectors based on motion of the target relative to the moving platform and estimate a dominant motion vector based on the optical flow vectors; and
 a processor configured to determine the velocity of the target based on the position, the radial velocity, and the dominant motion vector, and to assess a threat of a collision with the target using the velocity of the target, wherein evasive action is taken at the moving platform based on the assessment of the threat.

11. The fusion system according to claim 10, wherein the vision system includes a camera.

12. The fusion system according to claim 10, wherein the radar system defines a region of interest.

13. The fusion system according to claim 12, wherein the vision system obtains the optical flow vectors for points in the region of interest.

14. The fusion system according to claim 12, wherein the vision system is calibrated with the radar system.

15. The fusion system according to claim 10, wherein the vision system clusters the optical flow vectors to determine the dominant motion vector.

16. The fusion system according to claim 10, wherein the processor determines range r, azimuth angle θ, radial speed s, and position vector p from the position and the radial velocity, determines accuracy σ of the radial speed s, and obtains a two-by-two covariance matrix Σ representing error in the domination motion vector estimate.

17. The fusion system according to claim 16, wherein the processor determines the velocity of the target by solving to minimize:

$$v^* = \text{argmin}_v \frac{\left|\frac{p^T v}{r} - s\right|^2}{\sigma^2} + (h(v, p) - q)^T \sum\nolimits^{-1} (h(v, p) - q),$$

v is the velocity of the target, h(v,p) is a function mapping the velocity of the target in an x-y coordinate system used by the radar system to the dominant motion vector q in a u-v coordinate system used by the vision system.

18. The fusion system according to claim 16, wherein the processor obtains the two-by-two covariance matrix Σ using a covariance matrix of the optical flow vectors from a region of interest.

19. The fusion system according to claim 16, wherein the processor determines the accuracy σ of the radial speed s based on a specification of the radar system.

20. The fusion system according to claim 10, wherein the radar system includes a transceiver.

* * * * *